(12) United States Patent
Morvan et al.

(10) Patent No.: US 10,370,583 B2
(45) Date of Patent: Aug. 6, 2019

(54) AMINOSULPHONATE FOAM STABILIZERS

(71) Applicant: RHODIA OPERATIONS, Paris (FR)

(72) Inventors: Mikel Morvan, Pessac (FR); Max Chabert, Paris (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/311,305

(22) PCT Filed: May 4, 2015

(86) PCT No.: PCT/EP2015/059750
§ 371 (c)(1),
(2) Date: Nov. 15, 2016

(87) PCT Pub. No.: WO2015/173052
PCT Pub. Date: Nov. 19, 2015

(65) Prior Publication Data
US 2017/0107421 A1    Apr. 20, 2017

(30) Foreign Application Priority Data
May 15, 2014 (FR) .................................. 14 01088

(51) Int. Cl.
| C09K 8/594 | (2006.01) |
| C09K 8/584 | (2006.01) |
| C09K 8/94 | (2006.01) |
| E21B 43/16 | (2006.01) |

(52) U.S. Cl.
CPC .............. C09K 8/584 (2013.01); C09K 8/594 (2013.01); C09K 8/94 (2013.01); E21B 43/168 (2013.01)

(58) Field of Classification Search
CPC .......... E21B 43/16; E21B 43/168; C09K 8/58; C09K 8/584; C09K 8/59; C09K 8/594
See application file for complete search history.

(56) References Cited

U.S. PATENT DOCUMENTS

| 4,703,797 | A | * | 11/1987 | Djabbarah | ............. | C09K 8/594 |
| | | | | | | 166/252.1 |
| 5,591,701 | A | * | 1/1997 | Thomas | .................... | C09K 8/38 |
| | | | | | | 507/203 |
| 8,714,247 | B1 | * | 5/2014 | Berger | .................... | C09K 8/584 |
| | | | | | | 166/268 |
| 8,985,206 | B2 | * | 3/2015 | Morvan | ................. | C09K 8/584 |
| | | | | | | 166/270 |
| 2012/0285694 | A1 | * | 11/2012 | Morvan | ................. | C09K 8/584 |
| | | | | | | 166/309 |
| 2013/0045898 | A1 | * | 2/2013 | Witters | .................. | A61K 8/046 |
| | | | | | | 507/202 |

FOREIGN PATENT DOCUMENTS

| JP | 59112959 A | 6/1984 |
| WO | 9417154 A1 | 8/1994 |
| WO | 2013174823 A1 | 11/2013 |

* cited by examiner

Primary Examiner — Zakiya W Bates
Assistant Examiner — Crystal J Miller

(57) ABSTRACT

The present invention relates to the use of an aminosulphonate compound corresponding to the following formula (I): $R^1R^2N-CHR^3-CHR^4-CHR^5-SO_3^-$ (I) where: •$R^1$ is a preferably $C_2$ to $C_{24}$ alkyl or alkylamido radical; •$R^2$ is an optionally hydroxylated alkyl radical; •$R^3$, $R^4$ and $R^5$ are, independently of one another, H or OH; it being understood that at least one of the $R^3$, $R^4$ and/or $R^5$ groups is OH, for stabilizing a foam, in particular a foam used to extract hydrocarbons in an underground formation.

7 Claims, No Drawings

AMINOSULPHONATE FOAM STABILIZERS

This application is a U.S. national phase entry under 35 U.S.C. § 371 of International Application No. PCT/EP2015/059750, filed on May 4, 2015, which claims priority to French Application No. 1401088, filed on May 15, 2014. The entire contents of these applications are incorporated herein by this reference.

A subject matter of the present invention is foam-stabilizing aminosulfonate compounds, of use in particular in the context of the recovery of hydrocarbons present in a subterranean formation. These compounds prove to be very particularly suitable for enhanced oil recovery (EOR).

During the extraction of crude oil from a hydrocarbon reservoir (oil-bearing reservoir, such as a rock or sand formation, for example), on conclusion of the primary recovery stage, during which the hydrocarbons are entrained out of a production well by the excess pressure naturally prevailing within the ground, only a very low amount of the hydrocarbons is extracted, typically of the order of 10%. In order to improve the extraction of the hydrocarbons subsequent to such a primary recovery, a standard method consists in carrying out a "secondary" recovery, namely by injecting a gas or a liquid (seawater or river water or also production water, for example) into the hydrocarbon reservoir via injection wells, so as to maintain, within the reservoir, an excess pressure suitable for continuing to convey the hydrocarbons toward the production well. This type of secondary recovery, however, only makes it possible to extract a relatively small part of the residual hydrocarbons (typically of the order of 30%), in particular as a result of the differences in viscosity and density existing between the injected fluid and the hydrocarbons in place, which bring about only a partial sweeping of the regions including hydrocarbons.

In order to further improve the effectiveness of the recovery by gas sweeping, provision has been made, in particular in U.S. Pat. No. 1,658,305, to carry out alternating sequential injections of water and then of gas (water alternating gas (WAG) process). More advantageously still, it is known to carry out other recovery stages, known as "enhanced oil recovery" (EOR) stages, other than "WAG" injections of the abovementioned type, in particular by continuing the recovery in the presence of foaming agents capable of forming a foam within the hydrocarbon reservoir. It is assumed that the foam thus formed makes it possible to optimize the contacting operation between the carrier stream injected at the injection wells and the oil-including regions of the reservoir. Provision has been made, in this context, to employ foaming agents in order to form a foam ex situ, which is subsequently injected into the injection wells (see, for example, U.S. Pat. No. 3,185,634). Alternatively, processes suitable for generating the foam in situ have been described, in which processes an aqueous medium containing the foaming agents and then a gas are injected sequentially, in alternating fashion ("SAG", for surfactant alternating gas, process, of the type described in particular in U.S. Pat. No. 2,866,507). For further details relating to the advantage of the use of foams for enhanced crude oil recovery, reference can in particular be made to WO2010/084369.

Different types of foaming agents have been provided for this type of application in EOR, among which may be mentioned, for example, anionic surfactants, in particular sulfonates, which are envisaged in U.S. Pat. No. 4,852,653; 5,046,560 or 5,076,357, non-ionic surfactants, such as those provided in U.S. Pat. No. 5,363,915, or else amphoteric surfactants of the type described in U.S. Pat. No. 5,614,473.

The use of foaming agents often exhibits disadvantages associated with a limited stability of the foam in the presence of oil, an excessively high adsorption, indeed even also a low solubility in the injection brine and/or water or also a low thermal stability.

Consequently, sulfonate-based foaming agents with a high stability at high temperature have been developed (U.S. Pat. No. 4,393,937). The use of alkoxylated sulfonates has made it possible to improve the solubility in injection brines and water (U.S. Pat. No. 5,046,560, 4,856,589, 4,540,050 or US2012/220502).

In addition, in order to obtain satisfactory foams, the foaming agents often require the additional use of foam boosters, the use of which is, itself also, capable of having repercussions in terms of processing costs. This is in particular the case with surfactants of sulfonate type, which often require the use of foam boosters of betaine type, as described in particular in US 2011/275546.

It is an aim of the present invention to provide foam stabilizers suitable in particular for the formation of stable foams under the conditions employed in enhanced oil recovery (EOR) operations.

To this end, the present invention provides for the use of an aminosulfonate compound having the following formula (I):

$$R^1R^2N\text{---}CHR^3\text{---}CHR^4\text{---}CHR^5\text{---}SO_3^- \qquad (I)$$

in which:
  $R^1$ is an alkyl or alkylamido radical;
  $R^2$ is an optionally hydroxylated alkyl radical;
  $R^3$, $R^4$ and $R^5$ are, independently of one another, H or OH;
   it being understood that at least one of the $R^3$, $R^4$ and/or $R^5$ groups is OH,
in order to stabilize a foam, in particular a foam employed in the recovery of hydrocarbons present in a subterranean formation.

In the context of this use, the compound of formula (I) can optionally be employed together with its protonated form of following formula (I'): $R^1R^2NH^+\text{---}CHR^3\text{---}CHR^4\text{---}CHR^5\text{---}SO_3^-$.

Thus, according to one embodiment, the aminosulfonate compound is employed solely in its "non-protonated amine" form (I).

According to another embodiment, use is made, according to the invention, of a mixture of the non-protonated form (I) and of the protonated form (I'), with an (I')/(I) molar ratio of the protonated form (I') to the non-protonated form (I) preferably of less than 1.

It is preferable for the aminosulfonate of the invention to be employed essentially in its non-protonated form of formula (I), typically with a protonated form (I')/non-protonated form (I) molar ratio of less than 10%, more preferably of less than 1%.

The aminosulfonate compounds used according to the invention are foaming agents which make it possible to form a foam which is sufficiently stable to be employed in the recovery of hydrocarbons present in a subterranean formation, it being possible for this foam to be preformed before injection into the subterranean formation or else to be formed in situ.

The stability of the foams obtained in the context of the invention is comparable to that of the foams obtained with the commonest commercial foaming agents, in particular with a very good thermal stability. Typically, the aminosulfonate compounds used according to the invention and the foams which they form are stable at temperatures which can range up to 100° C., indeed even up to 150° C.

Surprisingly, the aminosulfonate compounds used according to the invention have good foaming performances, including when they are used alone, which is advantageous in terms of application as it is not necessary to carry out a premixing of the constituents (as for the commercial products, typically employing mixtures of surfactants). Furthermore, when they are used alone, the aminosulfonate compounds according to the invention exhibit the advantage of preventing the chromatographic effects potentially obtained with multiple compounds.

The aminosulfonate compounds used according to the invention additionally exhibit, as a general rule, a relatively low adsorption on the majority of the rocks of subterranean formations, generally lower than that of the usual commercial foaming agents.

Furthermore, the aminosulfonate compounds used according to the invention exhibit another advantage, namely a good solubility in water, including in the presence of salts (hard water); consequently, they constitute, according to yet another aspect, a highly advantageous alternative to many other foaming agents.

The compounds used according to the invention of formula (I) are present, at least in part, in their "non-protonated" form (I), where the nitrogen atom of the amino group is not charged. It is possible to employ, in combination with this non-protonated form (I), the abovementioned protonated form (I'), where the nitrogen atom of the amino group is positively charged.

The aminosulfonate compounds of formulae (I) and (I') of the invention are typically used in combination with one or more counterions of the sulfonate ion. Mention may in particular be made, among the appropriate counterions, of the sodium, potassium, ammonium or alkylammonium cations, in particular the isopropylammonium cation.

In the context of the present description, the term "alkyl" denotes a linear or branched, preferably saturated, hydrocarbon radical which is optionally cyclized completely or in part and generally monovalent.

An "alkyl radical" within the meaning of the present description can thus in particular be a saturated monovalent hydrocarbon radical comprising from 1 to 24, preferably from 1 to 20 and in particular from 6 to 12 carbon atoms, such as, for example, the methyl, ethyl, n-propyl, isopropyl, n-butyl, sec-butyl, t-butyl, pentyl or n-hexyl radicals.

An alkyl radical according to the present description can be unsubstituted (consisting entirely of carbon and hydrogen atoms) or else, alternatively, be substituted on one or more carbon atoms, if appropriate preferably by at least one substituent selected from the group consisting of the following substituents: hydroxyl, alkoxy, amino, halo, carboxyl or phosphono. Thus, the alkyl radicals according to the invention can, for example, be chosen from the hydroxymethyl, hydroxyethyl, methoxymethyl, ethoxymethyl, isopropoxyethyl, aminomethyl, chloromethyl or trichloromethyl, carboxyethyl or phosphonomethyl radicals.

According to the present invention, the term "alkoxy" denotes an oxy radical substituted by an alkyl group as defined above. Mention may in particular be made, among the alkoxyl radicals, of the methoxyl, ethoxyl, propoxyl, isopropoxyl or butoxyl radicals, it being possible for the latter also to be substituted on one or more of their carbon atoms.

According to the present invention, the term "cycloalkyl" denotes a saturated cyclic hydrocarbon radical, in particular a saturated cyclic hydrocarbon radical comprising from 1 to 18 carbon atoms, such as, for example, the cyclohexyl or cyclooctyl radicals, which can optionally be substituted on one or more of their carbon atoms.

According to the present invention, the term "aryl" denotes an unsaturated monovalent hydrocarbon radical containing one or more carbon-based rings comprising 6 atoms in which the unsaturation can be represented by three conjugated double bonds, such as, for example, the phenyl, naphthyl, anthryl, phenanthryl or biphenyl radicals, which can optionally be substituted on one or more carbon atoms of the ring. According to one embodiment, an aryl radical is substituted on one or more of its carbon atoms by one or more substituents chosen from: hydroxyl, alkyl, halo, haloalkyl or amino. These substituted aryl radicals can then be chosen from the methylphenyl, dimethylphenyl, hydroxyphenyl, chlorophenyl, trichloromethylphenyl or aminophenyl radicals.

According to the present invention, the term "aralkyl" denotes an alkyl radical as defined above substituted by one or more aryl radicals. Mention may in particular be made of the phenylmethyl, phenylethyl or triphenylmethyl radicals, which can optionally be substituted on one or more of their carbon atoms.

According to the present invention, the term "alkaryl" denotes an aryl radical substituted by one or more alkyl radicals as defined above. Mention may be made, for example, of the methylphenyl, dimethylphenyl or trimethylphenyl radicals, which can optionally be substituted on one or more of their carbon atoms.

According to the present invention, the indication according to which a radical can be "optionally substituted" means, in general, unless otherwise indicated, that said radical can be substituted by one or more inorganic or organic substituents, such as, for example, alkyl, aryl, aralkyl or alkaryl, a heteroatom or a heterocycle, or by one or more functional groups which can coordinate metal ions, such as, for example, the hydroxyl, carbonyl, carboxyl, amino, imino, amido, phosphonic acid, sulfonic acid or arsenate groups, or their inorganic and organic esters, such as, for example, the sulfates or phosphates, or their salts.

According to the present invention, the terminology "($C_x$-$C_y$)" with reference to an organic group, in which x and y are integers, indicates that this group can contain from x carbon atoms to y carbon atoms per group.

According to one embodiment, in the abovementioned formula (I), $R^1$ represents an alkyl radical preferably comprising from 1 to 24 and preferably from 6 to 18 carbon atoms.

According to another embodiment, in the abovementioned formula (I), $R^1$ represents an alkylamido radical preferably comprising from 2 to 24 carbon atoms.

According to the invention, the term "alkylamido" denotes an alkyl radical substituted by an amido —NHC(O)$R^6$ radical, $R^6$ representing an alkyl radical as defined above, comprising in particular from 1 to 24, preferably from 6 to 18, carbon atoms.

An alkylamido radical within the meaning of the present description can, for example, be correspond to the following formula (A):

in which:
- $R^6$ represents a linear or branched alkyl radical comprising from 2 to 24 carbon atoms, for example from 6 to 18 carbon atoms, and preferably from 8 to 12 carbon atoms,
- n is an integer ranging from 2 to 5 and preferably equal to 2, 3 or 4.

According to one embodiment, in the abovementioned formula (I), $R^1$ represents a radical of abovementioned formula (A) in which n is 2.

According to one embodiment, in the abovementioned formula (I), $R^1$ represents a radical of abovementioned formula (A) in which $R^6$ represents an alkyl radical, preferably a linear alkyl radical, comprising 11 carbon atoms.

According to one embodiment, in the abovementioned formula (I), $R^1$ represents a radical of abovementioned formula (A) in which n is 2 and $R^6$ represents an alkyl radical, preferably a linear alkyl radical, comprising 11 carbon atoms.

A family of preferred compounds used according to the invention consists of compounds of following general formula (I-1):

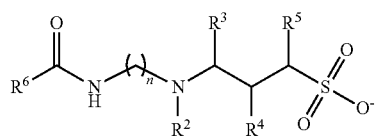

(I-1)

$R^2$, $R^3$, $R^4$, $R^5$, $R^6$ and n being as defined above.

According to one embodiment, in the abovementioned formula (I) or (I-1), $R^2$ is an alkyl radical, in particular a non-hydroxylated alkyl radical, that is to say an alkyl radical unsubstituted by a hydroxyl group, preferably comprising from 2 to 20 and preferably from 2 to 10 carbon atoms.

According to one embodiment, in the abovementioned formulae (I) and (I-1), $R^2$ is a hydroxyalkyl radical. The term "hydroxyalkyl" or "hydroxylated alkyl" denotes an alkyl radical substituted by a hydroxyl group. Such a radical can, for example, be represented by the formula -A-OH, A representing a linear or branched alkylene radical comprising from 2 to 20, preferably from 2 to 10, carbon atoms. Preferably, $R^2$ is a hydroxyalkyl radical comprising from 2 to 20, preferably from 2 to 10, carbon atoms.

According to one embodiment, $R^2$ is a hydroxyethyl radical.

A family of advantageous compounds used according to the invention consists of compounds of following general formula (I-2):

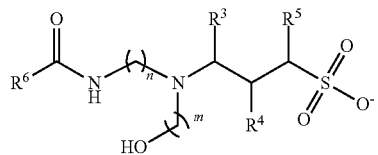

(I-2)

$R^3$, $R^4$, $R^5$, $R^6$ and n being as defined above and m being an integer ranging from 1 to 10, preferably from 2 to 6.

A family of preferred compounds used according to the invention consists of compounds of following general formula (I-3):

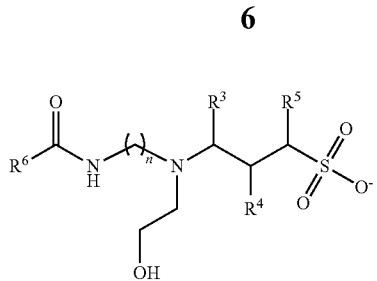

(I-3)

$R^3$, $R^4$, $R^5$, $R^6$ and n being as defined above.

According to one embodiment, in the formulae (I), (I-1), (I-2) and (I-3) as defined above, $R^4$ is OH and $R^3$ and $R^5$ are, independently of each other, H or OH.

A family of preferred compounds used according to the invention consists of compounds of following general formula (I-4):

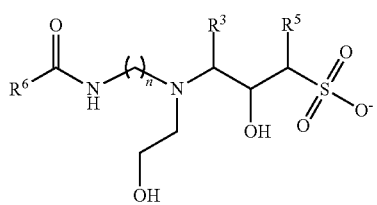

(I-4)

$R^3$, $R^5$, $R^6$ and n being as defined above.

According to one embodiment, in the formulae (I), (I-1), (I-2), (I-3) and (I-4) as defined above, n is equal to 2.

A family of preferred compounds used according to the invention consists of compounds of following general formula (I-5):

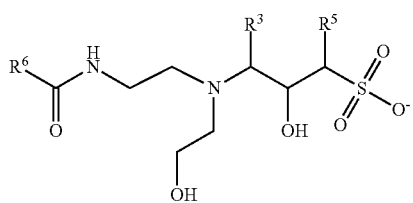

(I-5)

$R^3$, $R^5$ and $R^6$ being as defined above.

A family of preferred compounds used according to the invention consists of compounds of following general formula (I-6):

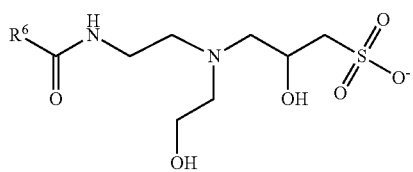

(I-6)

$R^6$ being as defined above.

According to an advantageous embodiment, the aminosulfonate compound employed according to the present invention corresponds to either of the following formulae:

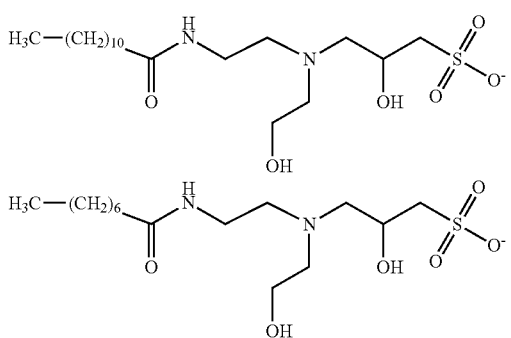

Preferably, the aminosulfonate compound corresponds to the following formula:

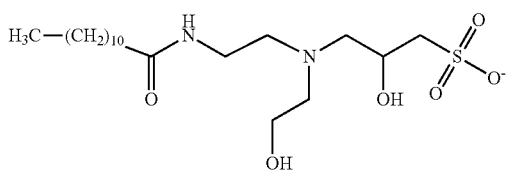

Use may be made, according to the invention, as aminosulfonate compound, of one of the following commercial products: Mackam LS, MAckterra LS, Miranol CS or Miranol JS.

Preferably, the present invention relates to the use of the product Mackam LS.

According to one embodiment, the aminosulfonate is employed essentially in its non-protonated form of formula (I), with a protonated form/non-protonated form molar ratio of less than 10%, preferably of less than 1%.

Preferably, the non-protonated form is the predominant compound.

The expression "protonated form/non-protonated form molar ratio" denotes the ratio of the number of moles of the protonated form of formula (I') to the number of moles of the non-protonated form of formula (I).

The present invention also relates to a method for the extraction of hydrocarbons present in a subterranean formation, comprising the injection under pressure within said formation of a foaming composition and of a gas appropriate for bringing about the expansion in volume of said foaming composition, said foaming composition comprising a compound of formula (I) as defined above, optionally in combination with its protonated form of formula (I') as defined above.

According to the invention, the above extraction method can be carried out either by forming the foam after injection into the subterranean formation (in situ foam formation) or by preforming the foam before injection into the subterranean formation (ex situ foam formation).

According to a specific embodiment, the above method is carried out with a foaming composition not comprising an anionic surfactant.

According to one embodiment, the above method is carried out with a foaming composition not comprising an additional foam stabilizer. According to one embodiment, the above method is carried out with a foaming composition not comprising a foam stabilizer other than the aminosulfonate compound according to the invention.

According to one embodiment, the abovementioned method is carried out with a foaming composition comprising a compound of formula (I-1), (I-2), (I-3), (I-4), (I-5) or (I-6) as defined above.

According to one embodiment, in the abovementioned method, the foaming composition is an aqueous composition which preferably comprises the compound of formula (I) and optionally its protonated form (I') at a content of 0.01% to 10% by weight, more preferably of 0.1% to 1% by weight, with respect to the total weight of water.

Typically, a foaming composition according to the invention comprises the compound of formula (I) and optionally its protonated form (I') at a content of 0.5% to 2% by weight, with respect to the total weight of said composition.

According to one embodiment, the abovementioned method is carried out with a foaming composition comprising a compound of following formula:

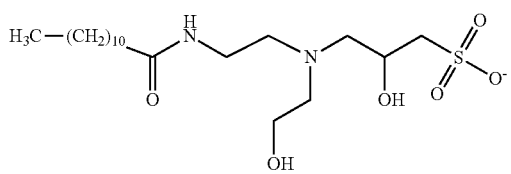

The present invention also relates to a method for the extraction of hydrocarbons present in a subterranean formation, comprising the following stages:
 (a) the injection under pressure within said formation of a foaming composition comprising an aminosulfonate compound as defined above,
 (b) the introduction under pressure within said formation of a gas appropriate for bringing about the expansion in volume of said foaming composition, and
 (c) the extraction of the hydrocarbons via a well in the subterranean formation.

According to one embodiment, in the abovementioned method, the foaming composition can comprise water. It can also comprise a gas mixture appropriate for bringing about the expansion in volume.

According to one embodiment, the constituents, in particular the aminosulfonate and the gas, are mixed before being introduced into the subterranean formation. According to another embodiment, they can be injected at different moments, for example sequentially.

The present invention also relates to a method for the extraction of hydrocarbons present in a subterranean formation, comprising the following stages:
 (a) the formation of a foam from a foaming composition comprising an aminosulfonate compound as defined above and from a gas appropriate for bringing about the expansion in volume of said foaming composition,
 (b) the injection of said foam within said formation, and
 (c) the extraction of the hydrocarbons via a well in the subterranean formation.

The present invention also relates to a method for improving the extraction of hydrocarbons present in a subterranean formation, comprising the following stages:
 (a) the injection under pressure within said formation of a foaming composition comprising an aminosulfonate compound as defined above,
 (b) the introduction under pressure within said formation of a gas appropriate for bringing about the expansion in volume of said foaming composition, and (c) the extraction of the hydrocarbons via a well in the subterranean formation.

In the context of the abovementioned methods, the term "gas appropriate for bringing about the expansion in volume" denotes a gas such as air, carbon dioxide, nitrogen, steam or natural gas, in particular present in the subterranean formation. Typically, this gas is carbon dioxide or natural gas present in the subterranean formation.

The present invention also relates to a method for improving the stability of the foams in an aqueous foaming composition, comprising a stage of addition to said aqueous foaming composition of an aminosulfonate compound as defined above.

According to one embodiment, the foam stabilizer according to the invention, namely the aminosulfonate as defined above, increases the stability of the foam of an oil well treatment fluid. According to another embodiment, the foam stabilizer described here increases the stability of the foam of a foaming composition which can be used as a part of an oil well treatment fluid. The foaming composition can also be used in combination with an oil well treatment fluid in a multistage process for recovering the oil from a subterranean formation.

The foam stabilizer can be a component of a combination introduced alone into the subterranean formation or with another fluid or another composition, for example with the foaming composition or the oil well treatment fluid.

The present invention also relates to a method for improving the extraction of oil present in an oil-bearing formation comprising the addition of a foam stabilizer according to the invention to an aqueous foaming composition or to an oil well treatment fluid.

According to one embodiment, a foaming composition comprising at least one foam stabilizer according to the invention is introduced, for example injected, into a subterranean formation or reservoir at elevated pressure in order to shift or release the oil. The foaming composition, which gives a form or a consistency of foam type, enters and settles in the fractures of the formation (i.e., in the regions of high permeability) and substantially diverts one or more gases, or a gas/surfactant mixture or a gas/aqueous fluid mixture, toward the less permeable oil-bearing matrix (i.e., into the regions of low permeability).

This can subsequently mobilize the trapped oil and/or gas from the matrix through the network of fractures. The foaming composition acts as a barrier for entry into the network of fractures. When the network of fractures is effectively or substantially sealed off, the gas infiltrates into the porous matrix of the formation instead of the network of fractures. The gas forces the oil trapped in the matrix toward the network of fractures, where it can be easily recovered by conventional means.

According to one embodiment, other surfactants or polymers may be present in the foaming composition. The surfactants can act in order to decrease the interfacial tension between the treatment fluid and the oil trapped in the matrix of the formation and/or to increase the viscosity of the water injected during the treatment. In some embodiments, the gas used in the gas flooding operation described here is a gas or a combination of a gas and of aqueous fluids. The fluid can be in a supercritical state. The gas or the gas/fluid mixture can be injected, for example, by continuous injection. In some embodiments, an injection of gas is used in combination with an injection of water in a water-alternating-gas (WAG) process.

According to the invention, the term "reservoir" encompasses the term "oil-bearing formation" (including but not limited to carbonate oil-bearing formations), given that such a formation is typically located in a reservoir. One or more wells can be located close to the reservoir and/or to the formation with the aim of extracting the oil. The treatment fluid can be introduced via a well, a drill hole or an opening in the reservoir. The treatment fluid will then be introduced at a pressure sufficiently high to ensure substantial infiltration of the treatment fluid into the network of fractures of the formation and substantial exposure of the porous matrix of this formation. The oil can be extracted at the same place as or at another place than the point of introduction of the treatment fluid.

Thus, the present invention also relates to the use of the abovementioned aminosulfonate compounds in the oil sector. In particular, as indicated above, these compounds can be used in the implementation of enhanced oil recovery processes for gas mobility control.

According to the present invention, the term "mobility control" should be interpreted according to the broadest meaning and also includes a process in which the sweep efficiency for a reservoir or of an oil-bearing formation is improved.

These compounds can also be used in foams intended for well dewatering.

In addition, they can be used for foam fracturing, which consists in injecting a liquid comprising the compounds of the invention under very high pressures in order to fracture the well.

Finally, the compounds of the invention can also be used to form foams intended for the cleaning of soils.

EXAMPLE 1

Stability of Foams Obtained with the Aminosulfonates of the Invention at 90° C.

The stability of the foam formed with a given formulation is directly related to the effectiveness of this formula in controlling the mobility of the gas in a porous medium.

In this example, a stability is obtained which is comparable to that obtained with commercial foaming formulations comprising several compounds. This is particularly advantageous as the single-compound foaming formulations according to the invention are very easy to prepare.

The formulations are prepared at 0.5% by weight in a brine comprising 50 g/l of NaCl. They are equilibrated at 90° C. for one hour in closed containers and the foam is then generated in these closed containers by very vigorous mechanical stirring.

The height of the foam is measured over time in order to evaluate the resistance of the foam with regard to coalescence. The results are summarized in table 1 for the following compounds:

Mackam LS, a cocoyl sulfonate according to the present invention, in a solution at pH=10 and in a solution adjusted to pH=7 using hydrochloric acid;

a 1:1 Rhodacal A246L ($C_{14}$-$C_{16}$ α-olefinsulfonate)/Mackam 35 (cocamidopropyl betaine) mixture, known as an excellent foaming formulation by virtue of the effect of the betaine in improving the properties of the foam, in a solution at pH=7 and in a solution adjusted to pH=10 using sodium hydroxide; and a 1:1 Rhodacal A246L/Mackam CBS (cocamidopropyl hydroxysultaine) mixture, also known as an excellent foaming formulation, in a solution at pH=7 and in a solution adjusted to pH=10 using sodium hydroxide.

TABLE 1

Comparative study of the stability of the foams for several formulations

| Product | Half life of the foam at pH 10 (minutes) | Half life of the foam at pH 7 (minutes) |
|---|---|---|
| Mackam LS | 210 | 210 |
| Rhodacal A246L/Mackam 35 1:1 | 210 | 240 |
| Rhodacal A246L/Mackam CBS 1:1 | 70 | 240 |

In the light of the results, it is observed that the product Mackam LS, corresponding to a compound according to the invention, makes it possible to obtain foaming performances which are equal, indeed even superior, to those obtained with the two commercial mixtures, even when this is used as single compound.

Thus, this product provides excellent performances in comparison with the commercial products, while exhibiting the additional advantage of being much easier to prepare (single compound).

EXAMPLE 2

Adsorption on Reservoir Rocks of Formulations Based on Aminosulfonates According to the Invention and Comparison with Commercial Formulations In addition to the technical performance, the economic performances related to the loss of product by adsorption on the reservoir rocks play a key role in enhanced oil recovery processes.

In this example, the reduced adsorption of the product Mackam LS in comparison with the commercial products is demonstrated.

The formulations are prepared at 0.5% by weight in a brine comprising 50 g/l of NaCl and in standard seawater.

The formulations are brought into contact with a graded ground reservoir rock at 50° C. for 24 hours. The supernatant liquid is subsequently assayed and the adsorption is evaluated by using the difference in concentration between the supernatant liquid and the initial solution.

The results are presented in table 2 for the adsorption on Berea sandstone and Lavoux carbonate, for the three following formulations:
  Mackam LS, a cocoyl sulfonate according to the present invention, in a solution at pH=10;
  a 1:1 Rhodacal A246L ($C_{14}$-$C_{16}$ α-olefinsulfonate)/Mackam 35 (cocamidopropyl betaine) mixture, known as an excellent foaming formulation by virtue of the effect of the betaine in improving the properties of the foam, in a solution at pH=7 (mixture 1); and
  a 1:1 Rhodacal A246L/Mackam CBS (cocamidopropyl hydroxysultaine) mixture, also known as an excellent foaming formulation, in a solution at pH=7 (mixture 2).

TABLE 2

Mean adsorption of foaming formulations on sandstone and carbonate rocks under two salinity conditions

| | Adsorption (mg/g) | | | |
|---|---|---|---|---|
| Product | Berea NaCl 50 g/l | Berea seawater | Lavoux NaCl 50 g/l | Lavoux seawater |
| Mackam LS | 1 | 1.6 | 1.2 | 2.5 |
| Mixture 1 | 1 | 4 | 4 | 6 |
| Mixture 2 | 1 | 2 | 5 | 5 |

It can thus be noted that the adsorption of formulations based on Mackam LS is systematically lower than or equal to that obtained with commercial formulations (mixtures 1 and 2).

A strong improvement in seawater and on carbonate rocks is observed, which represents a very great challenge for foaming formulations in terms of adsorption.

Thus, the aminosulfonate-based formulations according to the invention provide, under certain conditions, a foam stability comparable to that obtained with commercial foaming formulations exhibiting a lower adsorption, which results in a better effectiveness of the process from an economic viewpoint.

The invention claimed is:

1. A method for improving the stability of foams in an aqueous foaming composition, the method comprising adding to the aqueous foaming composition a foam stabilizer consisting of an aminosulfonate compound corresponding to the following formula:

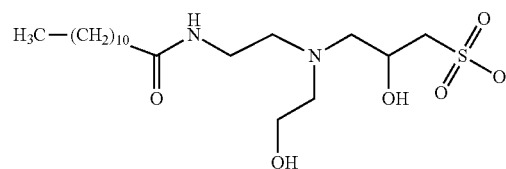

or a mixture of the aminosulfonate compound and its protonated form, wherein the aqueous foaming composition does not comprise an anionic surfactant and wherein the aqueous foaming composition does not comprise a foam stabilizer other than the aminosulfonate compound.

2. The method according to claim 1, wherein a mixture of the aminosulfonate compound and its protonated form is added and the protonated form/non-protonated form molar ratio is less than 10%.

3. The method according to claim 2, wherein the protonated form/non-protonated form molar ratio is less than 1%.

4. A method for the extraction of hydrocarbons present in a subterranean formation, the method comprising:
  (a) forming a foam from a foaming composition comprising: a foam stabilizer consisting of an aminosulfonate compound or a mixture of the aminosulfonate compound and its protonated form; and a gas appropriate for bringing about the expansion in volume of the foaming composition; wherein the aminosulfonate compound corresponds to the following formula:

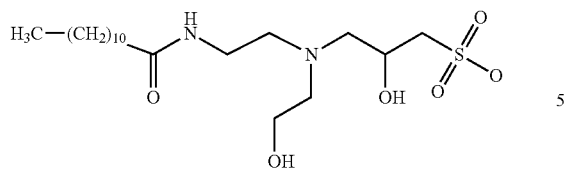

and wherein the foaming composition does not comprise an anionic surfactant and wherein the foaming composition does not comprise a foam stabilizer other than the aminosulfonate compound,
(b) injecting said foam within said formation, and
(c) extracting the hydrocarbons via a well in the subterranean formation.

5. The method as claimed in claim 4, wherein the foaming composition is an aqueous composition.

6. The method as claimed in claim 5, wherein the foaming composition comprises at a content of 0.01% to 10% by weight, with respect to the total weight of water, the aminosulfonate compound or mixture of the aminosulfonate compound and its protonated form.

7. The method as claimed in claim 6, wherein the foaming composition comprises at a content of 0.1% to 1% by weight, with respect to the total weight of water, the aminosulfonate compound or mixture of the aminosulfonate compound and its protonated form.

* * * * *